(12) United States Patent
Ruohonen et al.

(10) Patent No.: US 8,725,101 B2
(45) Date of Patent: May 13, 2014

(54) WIRELESS DEVICE AND METHOD OF OPERATION

(75) Inventors: Jari Juhani Ruohonen, Tampere (FI); Nguyen Quan Tat, Reading (GB); Sami Jutila, Oulu (FI); Roy S. Hansen, Dragor (DK)

(73) Assignee: Broadcom Corporation, Irvine, CA (US)

( * ) Notice: Subject to any disclaimer, the term of this patent is extended or adjusted under 35 U.S.C. 154(b) by 314 days.

(21) Appl. No.: 13/176,941

(22) Filed: Jul. 6, 2011

(65) Prior Publication Data

US 2013/0012135 A1 Jan. 10, 2013

(51) Int. Cl.
*H04B 17/00* (2006.01)

(52) U.S. Cl.
USPC ............... 455/226.1; 455/278.1; 455/296; 455/63.1; 375/219

(58) Field of Classification Search
USPC ............ 455/226.1, 278.1, 296, 63.1, 501, 455/67.11, 67.13, 114.2, 127.1; 375/219, 375/222; 370/480
See application file for complete search history.

(56) References Cited

U.S. PATENT DOCUMENTS

| | | | |
|---|---|---|---|
| 6,590,906 B1 * | 7/2003 | Ishida et al. | 370/480 |
| 6,842,607 B2 * | 1/2005 | Godfrey et al. | 455/41.2 |
| 6,940,845 B2 * | 9/2005 | Benveniste | 370/349 |
| 7,116,906 B2 * | 10/2006 | Volpi et al. | 398/77 |
| 7,245,882 B1 * | 7/2007 | McFarland | 455/73 |
| 8,027,292 B2 * | 9/2011 | Zhang et al. | 370/329 |
| 8,300,680 B2 * | 10/2012 | Pals et al. | 375/219 |
| 8,472,535 B2 * | 6/2013 | Wallen | 375/260 |
| 8,472,999 B2 * | 6/2013 | Zhang | 455/552.1 |
| 2005/0053036 A1 * | 3/2005 | Takeda | 370/332 |
| 2007/0206631 A1 | 9/2007 | Parts et al. | |
| 2008/0099559 A1 * | 5/2008 | Lo et al. | 235/441 |
| 2009/0040937 A1 | 2/2009 | Xhafa et al. | |
| 2009/0131054 A1 * | 5/2009 | Zhang | 455/436 |
| 2009/0318087 A1 | 12/2009 | Mattila et al. | |
| 2010/0240414 A1 * | 9/2010 | Lotenberg | 455/558 |
| 2012/0033604 A1 * | 2/2012 | Hirakawa et al. | 370/312 |
| 2012/0051293 A1 * | 3/2012 | Sakoda et al. | 370/328 |
| 2012/0226759 A1 * | 9/2012 | Lew et al. | 709/206 |
| 2013/0058433 A1 * | 3/2013 | Na et al. | 375/296 |
| 2013/0128827 A1 * | 5/2013 | Cheng et al. | 370/329 |
| 2013/0142098 A1 * | 6/2013 | Kwon et al. | 370/311 |
| 2013/0150106 A1 * | 6/2013 | Bucknell et al. | 455/501 |
| 2013/0203461 A1 * | 8/2013 | Li | 455/552.1 |

FOREIGN PATENT DOCUMENTS

| | | |
|---|---|---|
| WO | WO 2008/142529 A2 | 11/2008 |
| WO | WO 2011/006130 A1 | 1/2011 |
| WO | WO 2011/123527 A1 | 10/2011 |

OTHER PUBLICATIONS

Search and Examination Report for Application No. GB 1111564.9 dated Nov. 9, 2011.

* cited by examiner

*Primary Examiner* — Minh D Dao
(74) *Attorney, Agent, or Firm* — Stanton IP Law

(57) ABSTRACT

A wireless device has at least first and second radio systems. A first of the radio systems provides an indication for a second of the radio systems that it is transmitting or is about to transmit. The actual interference caused by transmissions by the first radio system to operation of the second radio system is measured, and/or the likely interference caused by transmissions by the first radio system to operation of the second radio system is estimated. The behavior of at least one of the first and second radio systems is modified in order to reduce the interference depending on the measured actual interference or estimated likely interference.

29 Claims, 1 Drawing Sheet

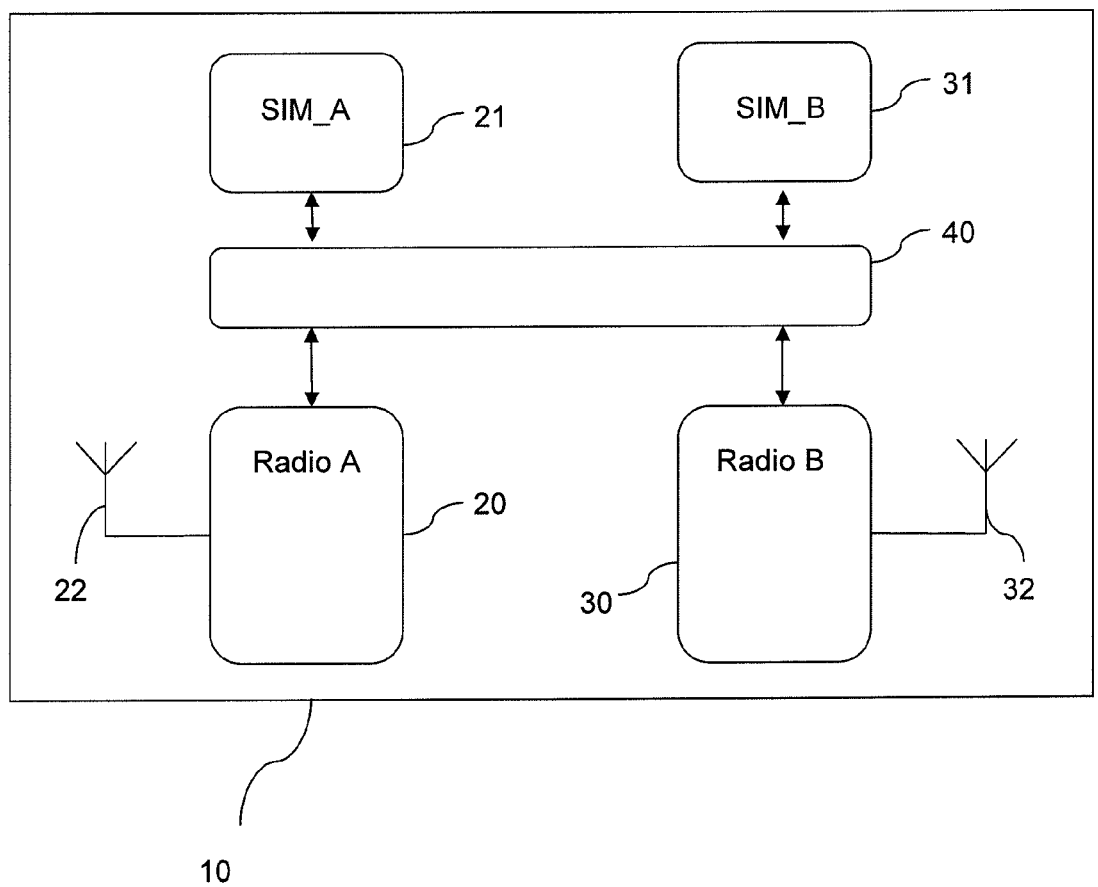

WIRELESS DEVICE AND METHOD OF OPERATION

FIELD OF THE INVENTION

The present invention relates to a wireless device and a method of operating a wireless device.

BACKGROUND OF THE INVENTION

A multi-SIM (subscriber identity module) wireless device, including particularly mobile devices such as mobile phones (including so-called "smart phones"), personal digital assistants, tablet and laptop computers, etc., can hold two or more SIM cards. Currently, such devices can typically hold two SIM cards, though phones that can hold three SIM cards are now available and it is likely that phones and other wireless devices that can hold more SIM cards will become available. It is mentioned here that there are proposals to replace SIM cards with SIM functionality provided by software in the device. Reference will be made in this specification generally to "SIM" to mean that part of a device that provides for the subscriber identity module functionality whether provided by a physical card, software elsewhere in the device, or any other suitable arrangement. In addition, for simplicity and brevity, reference will often be made in this specification to a dual-SIM device, which can operate with two networks and/or tariff arrangements, etc., but it will be understood that much of what is described herein can be applied to a multi SIM wireless device having in principle any number of SIMs for operating with a corresponding number of networks and/or tariff arrangements, etc.

Dual-SIM operation allows the use of two services without the need to carry two devices at the same time. For example, the same handset can be used for business and private use with separate numbers and bills. As another example, the same handset can be used for travel, with one SIM being for use in the home country and the other SIM being for the country visited. As another example, both SIMs may be used with the same network operator, for example to achieve a higher total bandwidth for data connections. As yet another example, the device may contain both cellular and non-cellular radios which are used for voice and data communication respectively using the different SIMs. In any event, using multiple SIMs allows the user to take advantage of different pricing plans for calls and text messages to certain destinations as well as mobile data usage, and/or to keep personal and business use separate for example, and/or to achieve higher bandwidth, and/or to obtain coverage across different networks using a single handset. The present invention is particularly concerned with mobile wireless devices that have two (or more) radio systems which can be used simultaneously, and thus allow for example a user to send or receive data whilst making a voice call, and/or to have plural voice calls active simultaneously, and/or to have plural data calls active simultaneously, all on the one device and using the separate radio systems.

With this multiple SIM functionality, the SIMs can in general be from any operator. The carrier frequencies used for communication between the mobile device and the base transceiver station can vary, in effect randomly, depending on the location of the mobile device and what frequencies each service provider has been allocated in that location.

The simultaneously active radio systems can cause radio interference to each other, particularly given that the radio systems are in the same device and physically very close to each other. This is a particular problem when the carrier frequencies used by the two or more SIMS are close to each other. For instance, a GSM (Global System for Mobile Communications) transmission of one radio can use transmission powers above 30 dBm. This can interfere with the reception of another radio, for which the received powers are typically between −50 dBm to −110 dBm, even if different frequencies are being used since some power may leak from the transmit band to the receive band due to the large power difference. Similarly, simultaneous transmission to a far away base station by one SIM radio system uses high power which may interfere with a lower power transmission to a close base station by the other SIM radio system if carriers having similar or close carrier frequencies are used. In general, this problem is exacerbated for a GSM system since 3G ("third generation") and LTE ("3GPP (3rd Generation Partnership Project) Long Term Evolution") systems use lower transmission powers over a wider spectrum range. However, a strong GSM carrier can cause interference for other systems as well. This interference problem can also arise from use of non-cellular radios at the same time as the cellular radios on the different SIMs, and indeed generally between radios using many different transmission and reception standards.

SUMMARY OF THE INVENTION

In accordance with a first aspect of the present invention, there is provided a method of operating a wireless device having at least first and second radio systems, the method comprising: a first radio system of a wireless device providing an indication for a second radio system of the device that it is transmitting or is about to transmit; at least one of: measuring the actual interference caused by transmissions by the first radio system to operation of the second radio system, and estimating the likely interference caused by transmissions by the first radio system to operation of the second radio system; and, modifying the behaviour of at least one of the first and second radio systems in order to reduce said interference depending on the measured actual interference or estimated likely interference.

Having several radio systems in a multi-SIM device presents problems of radio frequency interference that do not arise in single SIM devices or in multi-SIM devices that have a single radio system. The preferred embodiments of the present invention provide for a better end user experience with fewer dropped calls, better speech call quality, and fewer problems arising from and/or affecting applications that use a data service in a multi-SIM device that has plural radio systems that can be used simultaneously.

In an embodiment, the modifying the behaviour of at least one of the first and second radio systems is also dependent on a priority given to the respective operations of the first and second radio systems. This allows for example a user to prioritise voice calls over data calls, or to prioritise an active voice call over a voice call on another SIM that is on hold, or to prioritise a (particular) data call over any other call.

In an embodiment, the modifying the behaviour results in the first radio system reducing its transmission power. The power may be reduced just enough to prevent interference affecting the second radio system. A drop in transmission power by the first radio system can often easily be accommodated by virtue of the network that services the first radio system commanding the first radio system to use stronger channel encoding (albeit typically at a reduction of bit rate).

In an embodiment, the modifying the behaviour results in the first radio system ceasing or suspending transmission. Some protocols can tolerate a temporary suspension and subsequent resumption of for example a data call. Some data transmissions simply ignore dropped data packets altogether and the first radio system can be instructed to cease transmission (even if data packets are dropped) for short bursts to allow adequate reception on the second radio system. Otherwise, it may be necessary simply to cease the interfering call altogether. A user input may be required first to indicate that it is acceptable to have the first radio system cease transmission.

In an embodiment, the modifying the behaviour comprises transferring at least one of the first and second radio systems to operate on a different carrier. The use of different carriers, for example at a different frequency within the same cell or in a different cell servicing the device, may provide entirely different interference characteristics in the device. The interference characteristics expected after a transfer can be estimated using a for example a neighbour list for the calls in place on each of the first and second radio systems. If for example one of the calls is an active voice call, it may be preferred to try to avoid moving that to a different carrier if possible.

In an embodiment, the second radio system is receiving and the modifying the behaviour comprises: the first radio system providing information to the second radio system concerning a transmit signal that the first radio system will subsequently transmit; the second radio system estimating the likely interference that will be received at the second radio system when the first radio system transmits said transmit signal; and, the second radio system removing the estimated interference from signals received at the second radio system when the first radio system is transmitting said transmit signal. This embodiment pro-actively attempts to reduce or remove interference by attempting to cancel out the interference expected to be received at the receiving second radio system, and in a way such that a pre-calculation by the second radio system is only required for this purpose when the first radio system is actually transmitting.

In an embodiment, the second radio system is receiving and the modifying the behaviour comprises: the first radio subsystem reducing its transmission power for some of time slots in a transmission frame such that interference to the second radio subsystem is sufficiently reduced that the second radio subsystem can adequately receive a signal during the corresponding time slots in a reception frame to allow data intended to be received over the whole reception frame to be decoded from said received signal; the first radio subsystem restoring its transmission power for at least some of the remainder of the time slots in the transmission frame. This embodiment takes advantage of the fact that decoding of received data can often be achieved even when only say half of the data is received, by use of error correction techniques for example. The arrangement may be that the first radio subsystem has its transmission power reduced for half of a set of time slots and then restored for the remaining half.

In an embodiment, the first radio system provides an indication for the second radio system that it is transmitting or is about to transmit by writing a transmission start time and a transmission end time to a memory area which can be read by the second radio system. The first radio system can then send an interrupt to the second radio system to instruct it to read the times from the memory area. As an alternative, the second radio system may read the memory area at predetermined intervals and the first radio system may write the transmission start and end times sufficiently in advance of its transmission start time that the second radio system will have read the times by then. As another alternative, the signal sent by the first radio system to the second radio system is a different interrupt for each of the transmission start and end times, the second radio system reading an internal timer on receipt of each of the interrupts and comparing the read-out timer values with its own expected transmission or reception times. In another embodiment, the signal sent by the first radio system to the second radio system is a software-based message containing information relating at least to transmission start and end times.

In an embodiment, the actual interference caused by transmissions by the first radio system to operation of the second radio system in the case that the second radio system is receiving is measured by: comparing the quality of signals received by the second radio system when the first radio system is transmitting and when the first radio system is not transmitting. In some embodiments, the first radio system transmits during certain time slots only and is not transmitting during other time slots, the quality of signals received by the second radio system being compared for times corresponding to the two sets of time slots. A radio system not transmitting during certain time slots occurs as a matter of course in a TDMA (time division multiple access) based system, and also in other circumstances. This embodiment makes use of those times to enable an assessment of the interference being caused during transmission to be made. Alternatively or in addition, the method may comprise instructing the first radio system to stop transmission for a time period sufficient to allow the comparison to be made.

In an embodiment, the actual interference caused by transmissions by the first radio system to operation of the second radio system in the case that the second radio system is also transmitting is measured by: comparing the quality of signals transmitted by the second radio system when the first radio system is transmitting and when the first radio system is not transmitting. In one embodiment, this is achieved by using information obtained from the network servicing the second radio system.

In an embodiment, the estimating the likely interference caused by transmissions by the first radio system to operation of the second radio system is carried out by calculating the spectrum characteristics for the signal to be transmitted by the first radio system based on a modulated signal received for processing and transmission by the first radio system.

In an embodiment, the method comprises using pre-measured actual interference values in the estimation of likely interference caused by transmissions by the first radio system to operation of the second radio system. This can be used to improve the accuracy of the estimated interference. The pre-measured actual interference values can be obtained for various carrier combinations say and can be carried out in a production/manufacturing phase of the device.

According to a second aspect of the present invention, there is provided a wireless device, the device comprising: at least first and second radio systems, the first radio system being arranged to provide an indication for a second radio system of the device that it is transmitting or is about to transmit; and a processing system arranged to at least one of: measure the actual interference caused by transmissions by the first radio system to operation of the second radio system, and estimate the likely interference caused by transmissions by the first radio system to operation of the second radio system; the processing system being arranged to modify the behaviour of at least one of the first and second radio systems in order to reduce said interference depending on the measured actual interference or estimated likely interference.

There is also provided a computer program comprising code such that when the computer program is executed on a computing device, the computing device is arranged to cause a wireless device having at least first and second radio systems to carry out a method as described above.

There is also provided a processing system for a wireless device having at least a first and second radio systems, the processing system being arranged to cause a said wireless device to carry to a method a method as described above.

Further features and advantages of the invention will become apparent from the following description of preferred embodiments of the invention, given by way of example only, which is made with reference to the accompanying drawings.

BRIEF DESCRIPTION OF THE DRAWING

FIG. 1 shows schematically an example of a dual-SIM wireless device according to an embodiment of the present invention.

DETAILED DESCRIPTION OF THE INVENTION

Again, for simplicity, reference will typically be made in the following description to a dual-SIM wireless device (which includes particularly mobile devices, including mobile phones (including so-called "smart phones"), personal digital assistants, tablet and laptop computers, etc.), which can hold two SIMs and correspondingly has two radio systems, one for each SIM. It will be understood however that these principles can be applied to a multi-SIM wireless device having more than two SIMs (and typically a corresponding number of radio systems).

Referring initially to FIG. 1, a dual-SIM wireless device 10 has a radio front end 20,30 for each of two SIMs 21,22. Each radio front end 20,30 has its own respective antenna or set of antennas 22,32. Each radio front end 20,30 receives and transmits signals for the SIM channels corresponding to the respective SIMs 21,22 via transmit and receive circuitry 40 shown generically and schematically in the diagram. In general, the circuitry 40 provides physical layer, baseband, MAC (media access control) and link layer control for the two radio front ends 20,30. It will be understood that the circuitry 40 may in practice be implemented by one or more silicon chips or chipsets and may additionally host the application layers of the device 10. Other arrangements are possible, such as the radio front ends 20,30 providing the physical layer, baseband, MAC (media access control) and link layer control for the two SIM channels, or the radio front ends 20,30 providing the physical layer and baseband control and the circuitry 40 or some other common part providing MAC and link layer control. In the following, for simplicity, it will be assumed that the circuitry 40 provides for overall control of the radio front ends 20,30 and the associated circuitry, it being understood that in practice this control may be provided separately of the other functions described above. The control may be typically as a software implementation, though a hardware or combination of software and hardware implementation is also possible. For convenience, and reflecting how such components are often supplied and implemented in practice, the radio front end and transmit and receive circuitry and the control for each SIM subscription channel or non-cellular radio will often collectively be referred to simply as the modem and modem control in this specification.

Preferred embodiments of the present invention make use of three basic steps, which will now be described.

1. Detection of Simultaneous Radio Activity

In one embodiment, the modem control relating to one SIM subscription channel makes another SIM subscription channel aware that there is (radio frequency) transmission from the first SIM subscription channel. This allows the modem control for the other SIM subscription channel to be able to measure its reception quality when the interfering radio of the first SIM subscription channel is actively transmitting and when it is not actively transmitting, as described further below. In the case of TDMA (time division multiple access) based systems in particular, this also recognises that a radio may not actually be transmitting during a particular time slot even though it may be indicated as being used for an active connection.

A number of ways of conveying this information concerning transmission activity between the modem controls related to the different subscriptions are possible. For example:

1.1. There is a common time basis (e.g. a shared hardware counter) for all the modems and each modem is required to indicate the timings (start time and end time) of its transmission needs in advance. This information can be written to a shared memory area on a shared time basis for the writes from the modems. When one modem has had information written to the shared memory area, an interrupt can be used to instruct the other modem to read the information. Alternatively, there can be an agreement between the modems that all the information needs to be written X seconds in advance of when a transmission will commence and thus it is enough for each modem to read the memory at less than X seconds intervals.

1.2. The modems use interrupts to communicate to other modems the start and end of their transmissions. If a single, common interrupt for start and end is used, then a modem receiving an interrupt reads information about the type of interrupt from for example a hardware register or a shared memory as to whether the event is a transmit start or transmit end, the information being stored by the other modem before it generates the interrupt. Alternatively, different interrupts could be used for the transmit start and transmit end cases. In any event, the receiving modem then reads an internal timer value for each of the transmit start and transmit end, and records that timer value for each. After obtaining both the start and end times, the modem can compare whether the transmission of the other modem overlaps with its own reception or transmission and what is the portion of the overlap.

1.3. Each modem has its own hardware registers to which are written certain values when transmission or reception on that modem is active. When there is simultaneous transmission on plural modems, or simultaneous transmission on one modem and reception on another, interrupts are generated by the hardware to the other modem(s) in question and the nature of the conflict can be read from the hardware registers by software when prompted by the interrupts.

1.4. As another alternative, hardware signals, employing for example different voltage levels, transmitted on input/output lines from one modem to another can be used to indicate whether a modem is transmitting or receiving for example.

1.5. A software-based messaging system can be used between the modems. Each modem communicates all its RF activities (i.e. type, timing, transmit power) to the other modem(s) explicitly using messages under software control. A shared time basis for the communications between the modems is used.

In summary for the first step, the information delivered between the modems includes at least the transmission start and stop times. In certain embodiments, information concerning the transmission power of a transmitting modem is also delivered, which can be used when estimating the impact of the transmission in the second step.

2. Measuring or Estimating the Impact from Simultaneous Radio Activity

The degradation of RF quality of transmission and/or reception can be measured or estimated by different approaches depending on the situation.

2.1. Transmission by One Modem Interfering with Reception by Another Modem

When there are gaps in transmission by the one modem, the other modem can often make measurements of signals being received and come to a decision as to whether or not interference on the received signal is occurring.

For example, in the case that the interference is coming from a TDMA based system, it is in general very probable that simultaneous activity does not happen all the time because the transmission on the one modem occurs only in certain time slots. Moreover, in addition to these normal TDMA related gaps in the transmission, there may be other gaps in the transmission, depending on the telecommunications standard. For example, in the 3GPP specification, a mode known as UL-DTX (discontinuous transmission in the uplink) enables the modem to transmit discontinuously on the physical channel during periods of inactivity in data transmission, thus giving rise to other gaps in the transmission even though the modem may be indicated as active.

The other modem can use for example the normal bit error probability or quality measurements required by the 3GPP specification, or other similar or otherwise suitable measurements if for example another telecommunications standard is being used, and classify the results according to whether a result was measured from interfered reception or not. This one-off measurement carried out for a particular time instant is preferably followed by comparison of averaged results over a longer period as single sample values may not give information that is sufficiently reliable. The comparison of quality could be executed by comparing the training sequence bit error counts or by deriving signal-to-noise ratio-like quality estimates from the training sequences and received data in general. The point here is mainly to determine whether the difference in quality between interfered and non-interfered reception is significant enough for further action to be taken as set out in step 3 below.

If there are no gaps or insufficient gaps already present in the transmission from the one modem to enable the quality or some other metric to be measured when it is known that there is no inter-modem radio interference, then an instruction to force the interfering modem radio to stop transmission temporarily can be used. Similar techniques to those used for signalling described for step 1 above can be used, such as use of hardware interrupts or a software messaging system, etc. Such an instruction to the interfering modem to (temporarily) cease transmission would only typically be used if the interfered modem is suffering from bad reception quality and has a higher priority use case than the interfering transmitting modem. So, for example, in the case that transmission from a TDMA based system is interfering with a 3G or FDD (frequency division duplex) LTE system, it is in general possible to analyze the received signal quality separately for the time portion that the TDMA based system is active from the rest of the time when it is inactive. However, in the case that the two modems are using a continuous transmission, some kind of indication to the transmitting modem to force a gap in transmission will typically be needed.

2.2. Transmission by One Modem Interfering with Transmission by Another Modem

When there are gaps in transmission by the one modem, it is often possible to use information relating to transmissions by the other modem to determine whether any transmissions by the other modem are being affected by transmissions on the one modem. This can be done for example when the interfering system is TDMA based as transmission gaps are already present in certain time slots.

For the other modem, it is for example possible to calculate which uplink blocks suffered from simultaneous uplink transmission by the one modem, and how badly (i.e. how many bursts, and how large a portion of those bursts) effectively using information obtained from the network servicing the other modem. The information can be stored for later evaluation. In one example, this can be achieved by evaluation of the UL Ack/Nack (acknowledgement and negative-acknowledgement feedback) bitmaps where the network servicing the other modem indicates the uplink blocks that should be retransmitted. In this example, it is therefore possible to evaluate whether the uplink retransmission rate by the other modem, preferably averaged over time, is significantly higher for those blocks that were transmitted simultaneously with the one modem's transmissions, thus allowing a decision to be made that interference is occurring and that further action may be required to reduce this.

2.3. Estimating Interference by Theoretical Calculations

The use of estimates based on theoretical calculations can be used in conjunction with the two previous (measurement) methods to make them more robust or to avoid using those methods, and thus avoid running the control needed for those methods, in cases where it is clear that the two modems cannot be interfering with each other. This use of estimates can also be used with continuous transmission systems in order to avoid the need for forced gaps in transmission mentioned above. In addition, this use of estimates can be used to estimate the interference for a speech channel's transmission as there are no retransmissions with a speech channel and thus the only information about possible interference in the uplink direction is a possible offset in channel coding strengths of the uplink and downlink directions. Use of offsets in channel coding strengths is not a very robust method to be used alone as a small offset can also be caused just by differences in the radio channel characteristics in the uplink and downlink directions and not by interference between the modems as such.

The estimates based on theoretical calculations can make use of information such as the locations of the carriers, and knowledge of their transmission power and spectrum characteristics. A mathematical calculation is carried out to estimate how much of the transmission spectrum of one modem would leak on top of the receive spectrum of another modem, and similarly for the case of simultaneous transmissions from the two modems. Such a calculation can be carried out using knowledge of the operation of the modem, for example how the modem operates on a modulated signal that it receives in order to produce the signal that is transmitted such that the spectrum characteristics of a transmitted signal corresponding to any modulated signal can be estimated. The calculation can use a table for the data of how the power leaks per modulation as a function of frequency or it may be possible to use a mathematical formula. If the calculation result for the power leakage shows a larger value than a predetermined threshold value for the specific use case in question, then further action to reduce or stop the interference as set out in step 3 below can be applied. The knowledge about the measured reception quality can optionally be used as an additional input when making the decision, e.g. by adjusting the threshold based on the quality.

2.4. Pre-Measuring Interference

The accuracy of the theoretical calculations can be further improved by making measurements of actual interference for different carrier combinations and storing the information. This can be done for example in a production tuning phase during manufacture of the mobile device. Specific software for this testing can be implemented to command the mobile device to produce transmission on the desired carrier combinations. As typically the time spent for production phase tuning is limited, this in practice may mean measuring part of the combinations and interpolating the results for the remainder of the desired combinations. Similar assistance information can also be measured and stored during normal operation of the mobile device.

3. Action to Avoid or Reduce Radio Interference

Once it has been determined that the RF quality of transmission and/or reception by a modem radio has been sufficiently affected by self-interference with another modem radio within the same mobile device, various different steps can be taken to reduce or remove the interference, depending on the circumstances and to ensure the best end user experience. The mobile device may prioritize some active use cases (such as in examples 3.1. to 3.4. below). Alternatively or additionally, the severity of interference caused by transmission from one modem can be used as a parameter for actions to be taken to reduce the interference.

3.1. Suspendable Data Call Connection Interferes with a Speech Call

In the case of a data call interfering with a speech call, from the end user's point of view it might be better to ensure the quality of the speech call even if the data call is sacrificed or affected in some way. This can be achieved in a number of ways.

Some data connections can be suspended and subsequently resumed. With 2G/GPRS (General Packet Radio Service) data calls for example, it is possible to use the SUSPEND/RESUME signalling specified in 3GPP first to suspend the data connection and then resume it after the speech call has ended. In addition to the modem control in the mobile device being able to initiate the SUSPEND procedure in such a case, the required functionality may also include an indication of the coming suspension for the application that is using the data connection.

It should be noted that if the quality impact on a speech call is not critical but instead is relatively low, it is possible for the modem that has the speech call to request the modem that has the data call to use a lower transmission power. If the data call is not already operating under bad radio conditions, then the network link adaptation should be able to compensate for a reduction in transmission power from the data call modem by commanding it to use stronger channel coding upon detection by the network of the poorer receive quality occurring due to the lower uplink power. Thus a slight reduction in transmit power for data transmission from the one modem can correct a slight speech quality problem being caused on the other modem and still keep the data connection alive on the one modem, albeit at a lower data speed. This can be attempted first, and the data connection suspended only if this is not successful.

3.2. Non-Suspendable Data Call Connection Interferes with a Speech Call

If the interfering modem has a data connection active and is using a format that does not support suspension of the data call (as in 3G for example), then an option is to close the data connection on that modem. The action needed will include an indication to the application(s) using the data connection to force closing of the connection. A prompt may be provided to the end user asking for an acceptance from the end user before closing the data connection. This makes sense especially when the degradation of the speech call quality is not bad enough to cause a service drop and/or termination of the data connection would have a particularly adverse impact for the end user, for example a transfer of a long file would need to be started again from the start.

Again, if the quality impact on a speech call is not critical but instead is relatively low, it is possible for the modem that has the speech call to request the modem that has the data call to use a lower transmission power. If the data call is not already operating under bad radio conditions, then the network link adaptation should be able to compensate for a reduction in transmission power from the data call modem by commanding it to use stronger channel coding upon detection by the network of the poorer receive quality occurring due to the lower uplink power. Thus a slight reduction in transmit power for data transmission from the one modem can correct a slight speech quality problem being caused on the other modem and still keep the data connection alive on the one modem, albeit at a lower data speed. This can be attempted first, and the data connection closed only if this is not successful.

3.3. Speech Call on Hold Causes Interference for Active Speech Call

When a user has two or more simultaneous speech calls on a mobile device, then, even with multiple SIMs present, there typically can be only one active speech call at the time and the other speech call or calls are on hold. However, the call or calls on hold can interfere with the active call. An easy way to deal with this would be to provide a prompt for the end user to close the interfering call(s) that are on hold, or even just close them automatically, when interference (above some threshold) is determined to be present on the active call.

However, it may be possible to maintain the speech call(s) on hold in certain cases, and to do so in a way that is transparent to the user. One way of dealing with this is as follows:

a) The interference level caused between the current active carriers (i.e. those for the active speech call and for the call(s) on hold) is calculated mathematically (for example using similar techniques to those described in 2.3 and 2.4 above) and the result is compared against calculated estimated interferences for all the carrier combinations that are obtained when using carriers from the neighbour list of the active speech call and the neighbour list(s) of the call(s) in hold, in each case those carriers being strong enough for the required service.

b) If based on the mathematical estimation it is concluded that there is a better carrier combination which has less radio interference, then the reporting of measurement results relating to measured carrier receive signal strength, channel quality, etc. (depending on the network protocol) to the network by the modems is adjusted such that the network commands a handover to this better combination.

It should be noted that in practice, this may mean reporting worse results for the current carrier and better results for the wanted new carrier than are actually being achieved.

New carrier candidates with the least difference in receive quality and level from the current carrier may be given more weight when determining the new wanted carrier combination in order to avoid a major offset in reporting towards the network before and after the handover. Indeed, there may be a limit set for the maximum allowed offset in order to avoid adverse effects, for example in the case that the network is using the reported results in network planning. Nevertheless, even using the offsets inside allowed 3GPP error margins say may in many cases trigger or fasten triggering of a handover to the wanted combination.

Also the case where the carrier change would affect only the call(s) on hold and not the active speech call can be given more weight when possible, which ensures better quality for the active speech call.

If the network commands a handover to the wanted combination, then the reporting of results with adjusted measurement results as noted above needs to be continued as long as the speech call is active or the need for this vanishes due to changing measurement results. Re-evaluation of possible next carrier candidates is done in case the adjustment is not high enough to keep the current combination due to changing radio conditions or if the quality of carrier of the active speech call gets too bad and thus reporting adjusted results does not make sense any more.

3.4. Data Calls Cause Interference to Each Other

Techniques similar to those described previously in 3.1. to 3.3. can be used in the case that at least one data call is causing interference to another data call, depending on the circumstances.

Thus, if the system of at least one of the data calls supports suspension of data transfer and that active data call is causing interference to another data call, then suspending that first connection by temporarily closing it gives more robust functionality as the closing happens in controlled way. This can be attempted first in these circumstances if possible.

Depending on the magnitude of the measured quality degradation, the problem of interference being caused by an active data call to another can be compensated by reducing the transmission power of the data connection causing the interference. This can be used to avoid suspension of the data call, or can be used if suspension is not an option. This option is particularly useful in at least a 2G system as it is not as sensitive to the exact magnitude of the uplink power being used compared to a 3G system for example.

It may be possible to transfer one or more of the data connections to a different network carrier, using techniques like those described above.

Otherwise, it may be necessary to force an interfering data connection to close completely. Forced closing of the interfering data connection may involve mathematical calculations to calculate which connection causes most interference and also evaluation of the type of the active data transfers taking place in order to understand which connection would suffer least from a forced closing.

3.5. Skip Transmissions from Low Priority Case

With some combinations when two or more SIMs in a wireless device are active, it is possible to have the lower priority use case simply skip transmission when it would interfere with the RF operation of the higher priority use case, relying for example on the lower priority case transmissions being of the best effort type and being tolerant of dropped data. This requires that the modems deliver information about their RF requirements beforehand to each other (which may be achieved for example by the modems using techniques like those described in 1.1 to 1.5 above). The modem with the higher priority use case could then simply command a modem having a lower priority use to cease transmission when that would cause interference. This method is particularly suitable for those cases where the lower priority use case is having a non-acknowledged type of connection without retransmission (e.g. a UDP (User Datagram Protocol) transfer with RLC (radio link control) & LLC (logic link control) unacknowledged mode). A particular example might be where one SIM is being used for an active speech call and the other SIM is being used for non-acknowledge mode video streaming.

3.6. Removing Interference by Cancellation

This is particularly useful for the case where transmission by one modem is causing interference to reception by another modem. The bit pattern being transmitted is known by the transmitting modem. The pattern can be given as an input to the receiving modem. That receiving modem can then carry out interference cancellation by estimating the interference signal that will actually be received because of transmission of that bit pattern by the transmitting modem (for example using a technique similar to those described above, or using conventional estimation algorithms and the system knowledge of the receiver and transmitter), and then remove that estimated interference signal from the actual signal received by the receiving modem (which will include its intended reception signal as well as the actual interfering signal from the transmitting modem). It can achieve this removal by a simple filtering and subtraction function for example. This will improve the received signal, and is particularly useful for the case that the interference is not too strong.

3.7. Reducing Transmit Power Until Receive Signal Has Been Decoded

In general, owing to the use of error correction techniques, etc., decoding of received data can in a good part of the cases be done with only half of the data being received, for example if only half of the usual time slots are actually being used. This is true both at the base station and for the mobile device.

Therefore, in the case that a transmitting modem in a wireless device is interfering with reception on a receiving modem in the wireless device, then the transmit power from the transmitting modem can be reduced to a level such that the signal received at the receiving modem can be decoded after reception, the power reduction being for two out of four time slots say. Then the reception on the receiving modem can be skipped or ignored while the transmitting modem sends at a normal power level for the remaining two time slots to allow the base station to decode the transmitted message from the transmitting modem. This technique is particularly useful for the case that the receiving modem should be given higher priority than the transmitting modem.

3.8. Regular Monitoring of Interference

The interference from a transmitting modem to a receiving modem in a wireless device can be measured on a regular basis and the results of this can be used in the planning of priorities and interference reduction techniques which might be needed in the coming frame. As the interference can be measured and modelled in the preferred embodiments, it will give an advantage to monitor the amount even if there is not a clash between reception on one modem and transmission on the other that actually causes significant degradation or loss of data, etc. The interference in at least some cases is expected to be mainly dependent on the user's handling of the wireless device, such as hand position, and therefore a slowly changing process. This can be estimated by regular measurements of the leakage from the transmission side to the reception side transmission by turning on the reception side during its idle periods and measuring part or whole bursts, and updating the interference model based on this.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a wireless device having at least first and second radio systems, the method comprising:
a first radio system of a wireless device providing an indication for a second radio system of the device that it is transmitting or is about to transmit;
at least one of: measuring the actual interference caused by transmissions by the first radio system to operation of the second radio system, and estimating the likely interference caused by transmissions by the first radio system to operation of the second radio system; and,
modifying the behaviour of at least one of the first and second radio systems in order to reduce said interference depending on the measured actual interference or estimated likely interference,
wherein the modifying the behaviour comprises transferring at least one of the first and second radio systems to operate on a different carrier.

2. A method according to claim 1, wherein the modifying the behaviour of at least one of the first and second radio systems is also dependent on a priority given to the respective operations of the first and second radio systems.

3. A method according to claim 1, wherein the actual interference caused by transmissions by the first radio system to operation of the second radio system in the case that the second radio system is receiving is measured by:
comparing the quality of signals received by the second radio system when the first radio system is transmitting and when the first radio system is not transmitting.

4. A method according to claim 3, wherein the first radio system transmits during certain time slots only and is not transmitting during other time slots, the quality of signals received by the second radio system being compared for times corresponding to the two sets of time slots.

5. A method according to claim 3, comprising instructing the first radio system to stop transmission for a time period sufficient to allow the comparison to be made.

6. A method according claim 1, wherein the actual interference caused by transmissions by the first radio system to operation of the second radio system in the case that the second radio system is also transmitting is measured by:
comparing the quality of signals transmitted by the second radio system when the first radio system is transmitting and when the first radio system is not transmitting.

7. A method according to claim 6, wherein the comparing of the quality of signals is carried out using information obtained from the network servicing the second radio system.

8. A method according to claim 1, wherein the estimating the likely interference caused by transmissions by the first radio system to operation of the second radio system is carried out by calculating the spectrum characteristics for the signal to be transmitted by the first radio system based on a modulated signal received for processing and transmission by the first radio system.

9. A method according to claim 8, comprising using pre-measured actual interference values in the estimation of likely interference caused by transmissions by the first radio system to operation of the second radio system.

10. A computer program product comprising a non-transitory computer-readable medium and a computer program stored thereon, the computer program comprising code such that when the computer program is executed on a computing device, the computing device is arranged to cause a wireless device having at least first and second radio systems to carry out a method according to claim 1.

11. A processing system for a wireless device having at least a first and second radio systems, the processing system being arranged to cause a said wireless device to carry to a method according to claim 1.

12. A wireless device, the device comprising:
at least first and second radio systems, the first radio system being arranged to provide an indication for a second radio system of the device that it is transmitting or is about to transmit; and
a processing system arranged to at least one of: measure the actual interference caused by transmissions by the first radio system to operation of the second radio system, and estimate the likely interference caused by transmissions by the first radio system to operation of the second radio system;
the processing system being arranged to modify the behaviour of at least one of the first and second radio systems in order to reduce said interference depending on the measured actual interference or estimated likely interference,
wherein the processing system is arranged such that the modifying the behaviour comprises transferring at least one of the first and second radio systems to operate on a different carrier.

13. A device according to claim 12, wherein the processing system is arranged such that the modifying the behaviour of at least one of the first and second radio systems is also dependent on a priority given to the respective operations of the first and second radio systems.

14. A device according to claim 12, wherein the processing system is arranged such that the modifying the behaviour results in the first radio system reducing its transmission power.

15. A device according to claim 12, wherein the processing system is arranged such that the modifying the behaviour results in the first radio system ceasing or suspending transmission.

16. A device according to claim 12, the arrangement being such that when the second radio system is receiving:
the first radio system provides information to the second radio system concerning a transmit signal that the first radio system will subsequently transmit;
the second radio system estimates the likely interference that will be received at the second radio system when the first radio system transmits said transmit signal; and,
the second radio system removes the estimated interference from signals received at the second radio system when the first radio system is transmitting said transmit signal.

17. A device according to claim 12, the arrangement being such that when the second radio system is receiving:
the first radio subsystem reduces its transmission power for some of time slots in a transmission frame such that interference to the second radio subsystem is sufficiently reduced that the second radio subsystem can adequately receive a signal during the corresponding time slots in a reception frame to allow data intended to be received over the whole reception frame to be decoded from said received signal;
the first radio subsystem restores its transmission power for at least some of the remainder of the time slots in the transmission frame.

18. A device according to claim 12, wherein the actual interference caused by transmissions by the first radio system to operation of the second radio system in the case that the second radio system is receiving is measured by:

comparing the quality of signals received by the second radio system when the first radio system is transmitting and when the first radio system is not transmitting.

19. A device according to claim 18, wherein the first radio system is arranged to transmit during certain time slots only and not to transmit during other time slots, the quality of signals received by the second radio system being compared for times corresponding to the two sets of time slots.

20. A device according to claim 18, wherein the processing system is arranged to instruct the first radio system to stop transmission for a time period sufficient to allow the comparison to be made.

21. A device according to claim 12, wherein the processing system is arranged such that the actual interference caused by transmissions by the first radio system to operation of the second radio system in the case that the second radio system is also transmitting is measured by comparing the quality of signals transmitted by the second radio system when the first radio system is transmitting and when the first radio system is not transmitting.

22. A device according to claim 21, wherein the processing system is arranged such that the comparing of the quality of signals is carried out using information obtained from a network servicing the second radio system.

23. A device according to claim 12, wherein the processing system is arranged such that the estimating the likely interference caused by transmissions by the first radio system to operation of the second radio system is carried out by calculating the spectrum characteristics for the signal to be transmitted by the first radio system based on a modulated signal received for processing and transmission by the first radio system.

24. A device according to claim 23, comprising the processing system is arranged to use pre-measured actual interference values in the estimation of likely interference caused by transmissions by the first radio system to operation of the second radio system.

25. A method of operating a wireless device having at least first and second radio systems, the method comprising:
- a first radio system of a wireless device providing an indication for a second radio system of the device that it is transmitting or is about to transmit;
- at least one of: measuring the actual interference caused by transmissions by the first radio system to operation of the second radio system, and estimating the likely interference caused by transmissions by the first radio system to operation of the second radio system; and,
- modifying the behaviour of at least one of the first and second radio systems in order to reduce said interference depending on the measured actual interference or estimated likely interference,
- wherein the actual interference caused by transmissions by the first radio system to operation of the second radio system in the case that the second radio system is transmitting or receiving is measured by:
- comparing the quality of signals transmitted or received, respectively, by the second radio system when the first radio system is transmitting and when the first radio system is not transmitting.

26. A method according to claim 25, wherein the modifying the behaviour results in the first radio system reducing its transmission power.

27. A method according to claim 25, wherein the modifying the behaviour results in the first radio system ceasing or suspending transmission.

28. A method according to claim 25, wherein the second radio system is receiving and the modifying the behaviour comprises:
- the first radio system providing information to the second radio system concerning a transmit signal that the first radio system will subsequently transmit;
- the second radio system estimating the likely interference that will be received at the second radio system when the first radio system transmits said transmit signal; and,
- the second radio system removing the estimated interference from signals received at the second radio system when the first radio system is transmitting said transmit signal.

29. A method according to claim 25, wherein the second radio system is receiving and the modifying the behaviour comprises:
- the first radio subsystem reducing its transmission power for some of time slots in a transmission frame such that interference to the second radio subsystem is sufficiently reduced that the second radio subsystem can adequately receive a signal during the corresponding time slots in a reception frame to allow data intended to be received over the whole reception frame to be decoded from said received signal;
- the first radio subsystem restoring its transmission power for at least some of the remainder of the time slots in the transmission frame.

* * * * *